(12) United States Patent
Levy et al.

(10) Patent No.: US 6,686,900 B1
(45) Date of Patent: Feb. 3, 2004

(54) COMBINATION OF MESSAGE BOARD AND COMPUTER EQUIPMENT

(75) Inventors: Kenneth Lee Levy, Stevenson, WA (US); Amy Michelle Weissfeld, Stevenson, WA (US); J. Robert Craig, Stevenson, WA (US)

(73) Assignee: Acoustic Information Processing Lab, LLC, Stevenson, WA (US)

( * ) Notice: Subject to any disclaimer, the term of this patent is extended or adjusted under 35 U.S.C. 154(b) by 0 days.

(21) Appl. No.: 09/580,398

(22) Filed: May 26, 2000

Related U.S. Application Data

(60) Provisional application No. 60/136,630, filed on May 27, 1999, provisional application No. 60/165,575, filed on Nov. 15, 1999, and provisional application No. 60/172,345, filed on Dec. 16, 1999.

(51) Int. Cl.[7] .................................................. G09G 5/00
(52) U.S. Cl. ..................... 345/156; 248/442.2; 361/683; D14/450
(58) Field of Search ...................... 248/442.2; 361/683; 345/156; D14/448, 450

(56) References Cited

U.S. PATENT DOCUMENTS

| | | | | |
|---|---|---|---|---|
| 2,604,724 A | * | 7/1952 | Watts | 281/44 |
| 3,281,109 A | * | 10/1966 | Levandowski | 248/447.1 |
| 3,563,782 A | | 2/1971 | Liberman et al. | |
| 3,834,823 A | | 9/1974 | Sergely et al. | |
| 3,949,132 A | | 4/1976 | Seregely et al. | |
| 3,952,988 A | * | 4/1976 | Easterly | 248/447.1 |
| 4,635,893 A | * | 1/1987 | Nelson | 248/558 |
| 4,852,282 A | | 8/1989 | Selman | |
| 4,869,565 A | * | 9/1989 | Bachman | 312/234 |
| 4,996,110 A | * | 2/1991 | Tanuma et al. | 428/343 |
| 5,007,192 A | | 4/1991 | Hochberg | |
| 5,037,702 A | * | 8/1991 | Pitt et al. | 428/423.7 |
| 5,082,235 A | * | 1/1992 | Crowther et al. | 248/231.41 |
| D324,073 S | * | 2/1992 | Pinkos et al. | D19/52 |
| 5,095,385 A | * | 3/1992 | Stroll, Jr. | 359/609 |
| 5,104,087 A | * | 4/1992 | Wentzloff et al. | 248/442.2 |
| 5,122,941 A | * | 6/1992 | Gross et al. | 362/276 |
| 5,161,767 A | * | 11/1992 | Hansen | 248/447.1 |
| 5,328,145 A | * | 7/1994 | Charapich | 248/442.2 |
| 5,352,535 A | * | 10/1994 | Su | 428/511 |
| 5,367,350 A | | 11/1994 | Winfrey | |
| 5,398,905 A | * | 3/1995 | Hinson | 248/442.2 |
| 5,464,214 A | | 11/1995 | Griffin | |
| D367,857 S | * | 3/1996 | Emmerick | D14/450 |
| 5,527,568 A | * | 6/1996 | Boone et al. | 428/14 |
| 5,549,267 A | * | 8/1996 | Armbruster et al. | 248/442.2 |
| 5,549,268 A | * | 8/1996 | Hopwood | 248/442.2 |
| 5,638,096 A | | 6/1997 | Schwartz | |

(List continued on next page.)

FOREIGN PATENT DOCUMENTS

| | | | |
|---|---|---|---|
| DE | 19806312 A1 | * | 8/1999 |
| GB | 2250238 A | | 6/1992 |
| JP | 356059360 A | * | 5/1981 |
| JP | 11-119905 | * | 4/1999 |

OTHER PUBLICATIONS

McMaster Carr Catalog 1999 p. 1526 Parts 13315T23, T25, and T26 Plastic Display Stand.
McMaster–Carr's 1999 Catalog, p. 1522, item #59075T5.
U.S. patent application Ser. No. 09/579,726, Levy et al.
www.safebeginnings.com/webComponents/Catalog/Public/Showproduct.asp?id=295 & cat=Childproofing o, 1 if 1.
www.childproofer.com/products pp. 1–9 or 9.

*Primary Examiner*—Steven Saras
*Assistant Examiner*—Leland R. Jorgensen

(57) ABSTRACT

Combination of a message board and computer equipment for conveniently writing and/or maintaining notes while working on or near a computer. The message board can be written and rewritten upon, used to post paper notes or photographs, or both. The message board is attached to the perimeter or side of the computer monitor or case, or used in conjunction with the keyboard or mouse. The message board can be made of traditional materials, or erasable and malleable metals or plastics, such as acrylic.

29 Claims, 8 Drawing Sheets

U.S. PATENT DOCUMENTS

| | | | |
|---|---|---|---|
| 5,651,524 A | * 7/1997 | Calfee | 248/442.2 |
| 5,679,193 A | * 10/1997 | Yates | 156/145 |
| 5,775,919 A | 7/1998 | Gardner | |
| 5,786,861 A | * 7/1998 | Parker | 248/442.2 |
| 5,819,456 A | 10/1998 | Schwartz | |
| 5,876,010 A | * 3/1999 | Murphy | 248/346.01 |
| 5,901,937 A | * 5/1999 | Compeau et al. | 248/442.2 |
| 5,949,408 A | * 9/1999 | Kang et al. | 345/169 |
| 6,042,075 A | * 3/2000 | Burch, Jr. | 248/442.2 |
| 6,048,044 A | * 4/2000 | Biggel et al. | 312/258 |
| 6,050,964 A | * 4/2000 | Yates | 602/5 |
| 6,240,857 B1 | * 6/2001 | Elizer | 108/152 |
| 6,263,602 B1 | 7/2001 | Seiber et al. | |
| 6,272,779 B1 | 8/2001 | Seiber et al. | |
| 6,317,928 B1 | 11/2001 | Guillemette | |
| 6,354,227 B1 | 3/2002 | Feldpausch et al. | |
| 6,398,178 B1 | 6/2002 | Azola et al. | |
| 6,430,856 B1 | * 8/2002 | Schwartz | 40/642.01 |

* cited by examiner

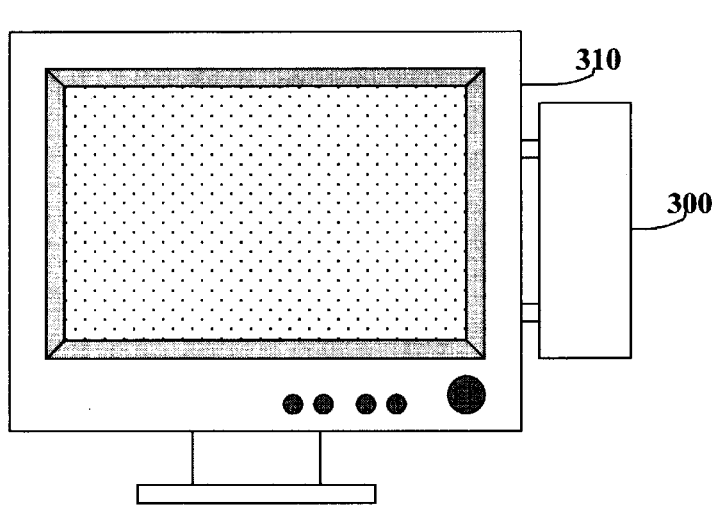
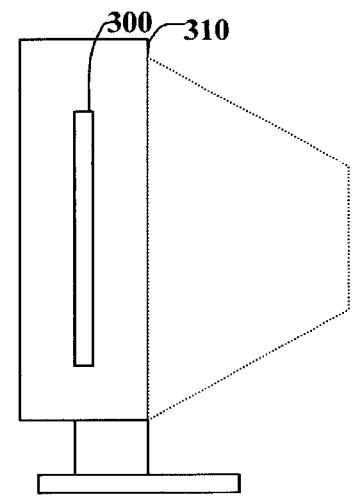
Fig. 3a          Fig. 3b
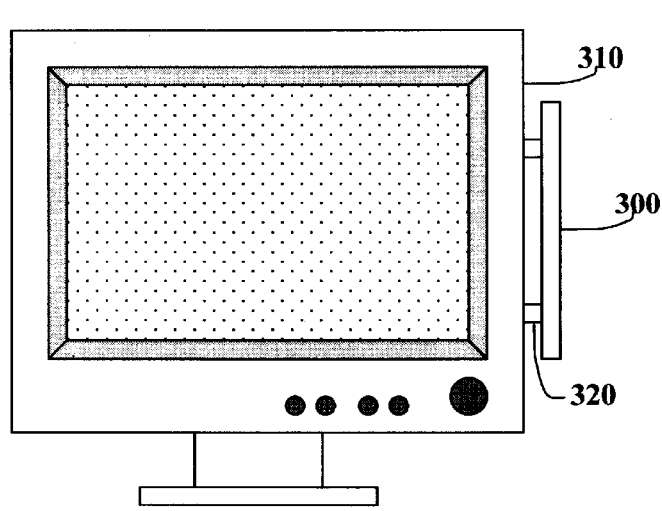
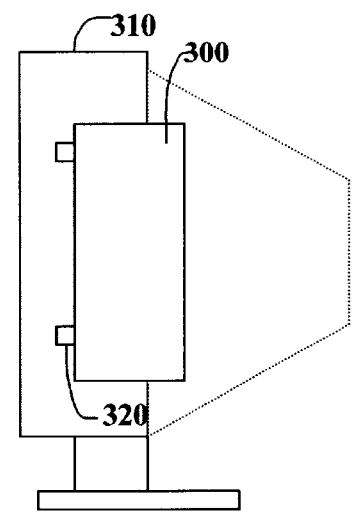
Fig. 3c          Fig. 3d

COMBINATION OF MESSAGE BOARD AND COMPUTER EQUIPMENT

This application claims the benefit of Provisional Patent Applications Ser. No. 60/136,630 on May 27, 1999, No. 60/165,575 on Nov. 15, 1999, and No. 60/172,345 on Dec. 16, 1999 incorporated herein by reference.

The application also relates to Utility patent application Ser. No. 09/579,726 filed on May 26, 2000 (the same date as this application) entitled "Shaped, Hinged Or Non-Opaque Message Boards" by the same authors as this application, Kenneth L. Levy, Amy M. Weissfeld, and J. Robert Craig, incorporated herein by reference.

BACKGROUND OF THE INVENTION

The present invention relates to the combination of message boards and computers.

Many people need to write quick messages or reminders while using their computers. These messages may relate to what they are doing on the computer, such as writing a document or working in a program. The messages may also include notes received from colleagues verbally or on the phone while working on or near the computer.

Most people write these messages on a scrap piece of paper, or a sticky note (i.e. 3M's Post-It Note™) that they may attach to their monitor or computer. These notes waste paper and valuable desk space, they are also easily lost.

In addition, there are computer programs that take notes, but these programs have several disadvantages. There is generally a delay when starting the program due to boot-up time, which is inconvenient when you want to jot down a quick message while on the phone or talking to someone in person. They also require the user to constantly switch between computer windows, which reduces the user's productivity. Finally, it takes time to organize the files on the computer.

There also exists boards that can be written on, erased, and re-used, labeled write boards. Current write board technology includes white boards (a.k.a. dry-erase or wet-erase boards), chalkboards, and magnetic-based boards (such as used for children's games). There also exist boards to which notes can be attached via thumbtacks or pushpins, labeled bulletin boards. Current bulletin board technology includes corkboards. Although these boards don't conserve paper, they make notes less likely to be lost. Both write and bulletin boards are grouped under the label message boards. Unfortunately, these message boards either attach to the wall, set upon an easel, or lay flat on your desk. Therefore, they are in a somewhat inconvenient location, and take up valuable desk or wall space.

A few existing inventions involve attaching bulletin and write boards to computer monitors, and computer monitors only. However, these previous inventions are not designed for convenience, functionality, and easy installation. In addition, some of these previous inventions disrupt the use of the computer.

Specifically, U.S. Pat. No. 5,104,087 by Wentzloff and Wentzloff (included herein by reference) shows a board that fits around the side of the computer. This board is hard to reach and requires a mounting bracket, thus increasing its cost and installation complexity, and decreasing its functionality.

U.S. Pat. No. 4,869,565 by Bachman (included herein by reference) discusses an adjustable board that mounts around the monitor. Such a board is expensive to make, difficult to install and requires special attachments. The board is also designed to hold messages and not to be written upon.

U.S. Pat. No. 5,328,145 by Charapich (included herein by reference) presents a message board that fits on the monitor with a rectangular hole for viewing the screen, thus blocking access to the monitor controls. The board is large enough to hold documents, but requires stabilizers to attach to the monitor since the front (a.k.a. bezel) of the monitor is usually curved. The board is also very obtrusive, blocking a lot of prime working space. The stabilizers also increase the distance the board is in front of the screen, which makes the screen harder to read.

U.S. Pat. No. 5,549,267 by Ambruster et al. of 3M (included herein by reference) describes a message board that mounts to a monitor. The board is designed to have a sticky surface upon which notes can be stuck over and over again, or to have tear-off sheets for note tacking and decoration. The invention is not a write board.

U.S. Pat. No. 5,638,096 by Schwartz (included herein by reference) discusses a board, labeled Screenies™, which fits around the bezel of a computer monitor. The frame covers four sides of the monitor, is mainly decorative, and requires a protective layer of laminate to protect the decorations, although it may contain a write or bulletin board surface. The invented frame ignores problems of accessing computer power controls, since it is four sided. In addition, there is no discussion of flexibility requirements, such that the frame can be flexible enough to attach to the monitor's bezel while being stiff enough to present a writing or posting surface that is large enough to be functional as a message board.

Catalog item 59075T5 of McMaster Carr's 1999 catalog (included herein by reference) at URL http://www.mcmaster.com includes a bulletin board that can affix to the monitor. It is also designed for desktops or shelves, and does not contain an erasable surface for writing messages. Additional items include standalone message boards, which are designed to be in close proximity to the computer but waste valuable desk space.

Finally, the Eegomania™ Desktop Organizer (patent-pending) at URL http://www.eegomania.com includes molded plastic with places for bulletin and write boards. This board has several problems in terms of being a message board. Its writing and bulletin surfaces are minimal whereas its colorful frame is its focus. Since the frame must have more thickness than a stand alone message board, the monitor screen seems far away, thus being harder to read. It is more expensive to build since several parts need to be put together. And again the four sides hide access to the monitor's controls.

SUMMARY OF THE INVENTION

It is an object of the present invention to provide a message board that has the advantages of saving time, paper, money and/or space over the prior art listed above. More specifically, the object of this invention is to present a message board for use with a computer that is convenient to use, easy to install, large enough to be functional, not so large as to be obtrusive, and can be inexpensively made by the manufacturer. The fashion in which this is done is by attaching the message board to the computer or peripheral device such that it is in a convenient location but does not affect the operation of the computer or peripheral. There are many example illustrations, described below or obvious extensions from the following description, of how this goal can be achieved.

These boards can be attached to or molded with the front bezel of a computer monitor such that the board encompasses all or part of the perimeter of the screen, leaving access to the monitor's controls. The screen perimeter is usually in a convenient location and is unused space, which makes it ideal for the present invention. If this perimeter message board covers all four sides of the screen, it can use a flexible, hinged and/or reusable attachment for easy access to the monitor's controls, assuming the controls are located on the front of the monitor. Otherwise, this perimeter message board can cover one to three sides of the screen, leaving access to the side with the controls. Alternatively, this perimeter message board could consist of two corner pieces, which allow the board to fit any size monitor, fit in a smaller shipping package, and be used in several configurations. The message board may be a rectangular shape, a lopsided shape to increase the writing area on the top or sides of the monitor, or a decorative shape, such as an egg, apple, hat, or ear. Additionally, the message board could be part of the bezel mold for the computer monitor. Preferably, the write message board for the peripheral of the computer monitor can be made of acrylic since it comes in many colors, can be transparent, is malleable, and works as a reusable writing surface, possibly requiring a hard coat.

The message board can also be attached to the side of the monitor and stick out, optionally using a flexible connection so it can be moved to the desired angle or out of the way when not in use. When using a moldable material, such as acrylic, this side-mount message board can be bent or molded with a bend to attach to the side or face of the monitor without any special attachment devices. If the writing surface is not erasable, a re-write surface can be attached or painted on to the face.

The message board can also be attached to the top or side of the main computer case. When on the side, the message board can optionally use a flexible connection such that it can be removed from view when not in use. Once again, when using a moldable material, such as acrylic, this side-mount message board can be bent to attach to the side or face of the computer case without any special attachment devices.

For a laptop, the message board can use a rotating or sliding connection such that the message board may be used while the screen is open and in-view. In addition, the message board can be compactly folded with the laptop.

The message board can also be attached to the perimeter of the computer keyboard or mouse. When attached to the bottom of the keyboard or mouse, the board should be recessed such that the pressure of the user's wrist does not accidentally erase the board. The raised portion around the board could be padded for extra comfort. The message board can also fit under the keyboard or mouse with a back portion that extends upwards as the writing surface, and an optional integrated wrist-rest. With ergonomic computer design being considered as law, the integration of the wrist-rest and message board for the keyboard or mouse is very desirable.

Alternatively, the message board could be attached to another peripheral, such as a printer, scanner, speaker, fax, telephone and so on.

Both the write and bulletin message boards can be mounted in close proximity to each other on the same or different computer devices. The message board can also be electronically compatible, such that these external notes can be loaded into the computer. Finally, the message board can have attachments, permanent and removable, for storing desktop and message supplies or photographs.

BRIEF DESCRIPTION OF THE DRAWINGS

FIG. 3a is a front view of a message board attached to the side of a computer monitor. If a flexible mounting is used, this figure displays the open position.

FIG. 3b is a side view of a message board mounted on the side of a computer monitor. If a flexible mounting is used, this figure represents the open position. As mentioned above, the dotted lines represent that a CRT may or may not exist.

FIG. 3c is a front view of a message board, in the closed position, mounted on the side of a computer monitor with a flexible attachment.

FIG. 3d is a side view of a message board, in the closed position, mounted on the side of a computer monitor with a flexible attachment. Once again, the dotted lines represent that a CRT may or may not exist depending upon whether the monitor is a CRT or flat-panel display.

DETAILED DESCRIPTION OF THE INVENTION

Figure 1A:
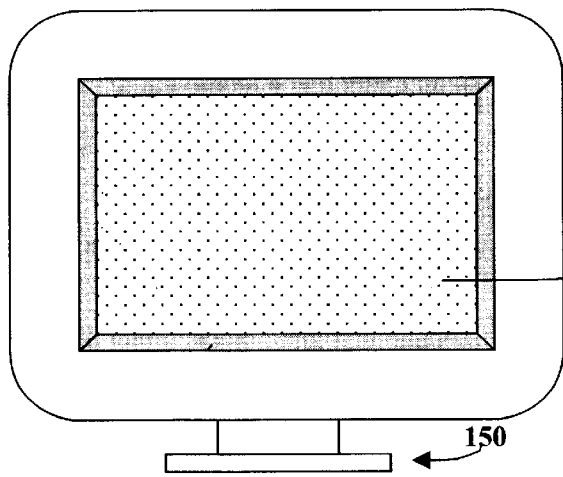
FIG. 1a is a front view of a four-sided message board attached to the front of a computer monitor.
Figure 1B:
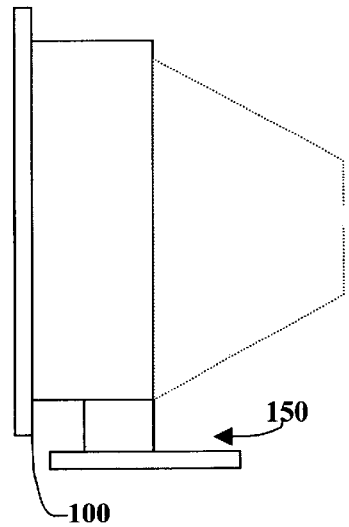
FIG. 1b is a side view of a four-sided message board attached to the front of a computer monitor. The dotted lines represent that a cathode-ray-tube (CRT) may or may not exist depending upon whether the monitor is a CRT or flat-panel display.

First, let's begin with some definitions. Most importantly, a message board can be a write board, a bulletin board, or both. A write board can be written upon and erased, over and over again. Current technology includes three types of write boards. The first is the old fashion chalkboard. The second is known as either a white, wet-erase or dry-erase board. These boards consist of a smooth reusable writing surface, usually white, and a marker that leaves erasable ink. More specifically, this surface can be attached to masonite or carboard, or the board can be made of materials which inherently have a reusable writing surface such as melamine, acrylic and other plastics and metals (labeled erasable plastics and metals). When using acrylic, other advantages are that the board can be made of any color, can be transparent, and can be malleable. The third type of write board is a magnetic-based board, and is usually associated with children's drawing games. With this type of board, the pen causes a magnetic material within the board to leave an erasable mark on the surface. Alternatively, the bulletin board stores previously produced materials, such as written or printed notes, photographs, etc. using a soft material and a pin-like object to secure the object. Currently, most bulletin boards consist of a corkboard and thumbtacks or pushpins. Additionally, a bulletin board could be a surface to hold sticky notes, such as 3M Post-it™ Notes. It is expected that in the future, new types of message boards will appear and be utilized in embodiments described below.

Additional definitions involve computer equipment. We are in the transition from a traditional stand-alone computer to a mixture of networked smart computer-like appliances. For example, you can now use your TV as a web browser with a special set-top box and remote keyboard. Thus, your TV is now included in what the patent refers to as a computer monitor. The TV's keyboard is also included in what the patent refers to as a keyboard. The list could go on. The patent's scope should not be limited by changes in terminology, but include the basic concepts presented below.

Some final definitions include the terms used in describing the drawings. A front, side or top view is, as expected, a two dimensional representation of the front, side or top of the object, respectively. The left-top-front perspective, is a two dimensional representation of the object when viewed from the left, above and in front of the object. In other words, you are looking down and to the left from in front of the object. The top-front perspective, is a two dimensional representation of the object when viewed from above and front.

Now, onto describing the novel message board combination, which involves a new use for a message board by attaching the board to a computer or peripheral device such that the board does not eliminate the functionality of the computer or peripheral device. This combination has the advantage that it allows the user to take notes while on or near the computer, thus increasing the user's productivity and reducing paper waste. There are several specific examples below of how to obtain this advantageous new use of a message board.

Face Mount Message Boards (FIGS. 1 and 2)

FIG. 1 shows the message board 100 around the four sides of the perimeter of a computer monitor 150. FIG. 1a shows the front view of the message board 100, and the monitor 150, with its screen 110 visible. FIG. 1b shows the side view of the message board 100, and corresponding monitor 150. The monitor 150 may be a traditional cathode-ray-tube (CRT) monitor or a flat-panel or liquid crystal display; thus, the tube part that exists for a CRT monitor and not a flat-panel display is shown with dotted lines.

Figure 1C:
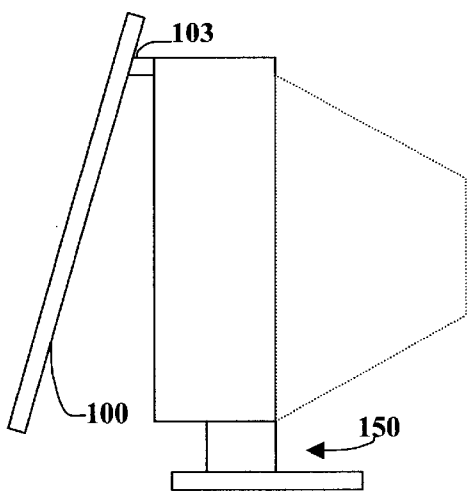
FIG. 1c is a side view of a four-sided message board attached to the front of a computer monitor using a flexible or hinged attachment in the partially open state. As in FIG. 1b, the dotted lines represent that a CRT may or may not exist.

For this four-sided message board, it is preferable to use an attachment between the message board 100 and the monitor 150 that enables the message board 100 to be removed or rotated out of the way of the monitor controls. Preferred methods of removable attachments include re-attachable hook-and-loop (i.e Velcro) with adhesive glue on one side, clips, or double-sided tape. For rotating attachments, the top of the message board 100 is mounted with a flexible or hinged mechanism such that the message board 100 can be rotated upwards to adjust the monitor controls (or sideways if the controls are on the left or right of the front of the monitor). FIG. 1c demonstrates the message board 100 in a partially open position using a flexible attachment 103 on the top of monitor 150.

Figure 1D:
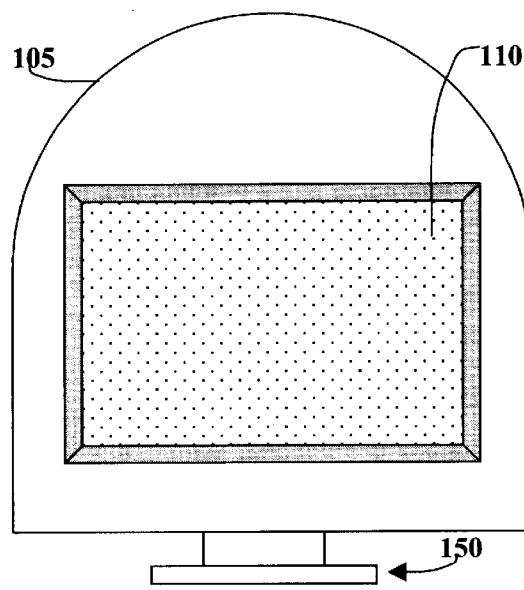
FIG. 1d is a front view of a four-sided, lopsided egg-shaped message board attached to the front of a computer monitor.

The message board may be any size or shape. In FIG. 1a, the rectangular shape is displayed. The preferred embodiment uses a 4½-inch border made of $\frac{1}{8}^{th}$-inch thick acrylic. The board may also be egg- or apple-shaped with a cutout for the screen, thus the top sticks up more than the bottom and provides extra writing space. FIG. 1d displays a lopsided egg-shaped board 105 attached to the monitor 150 (not visible) with a cutout for the screen 110.

Figure 2A:
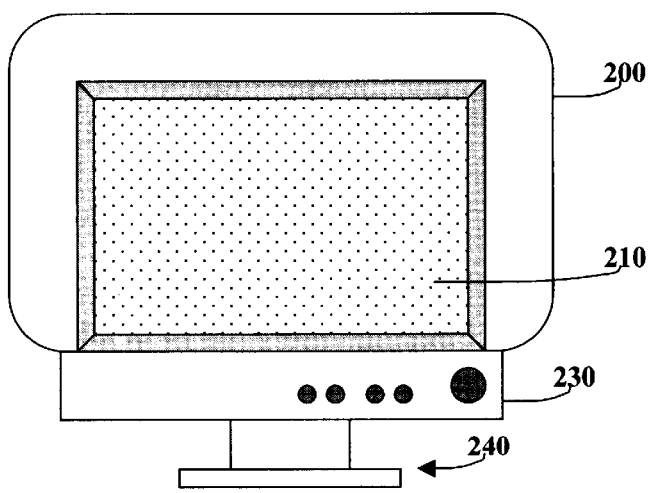
FIG. 2a is a front view of a three-sided message board mounted on the front of a computer monitor, thus leaving the controls, which are located on the bottom front of most monitors, accessible without moving the message board.
Figure 2B:
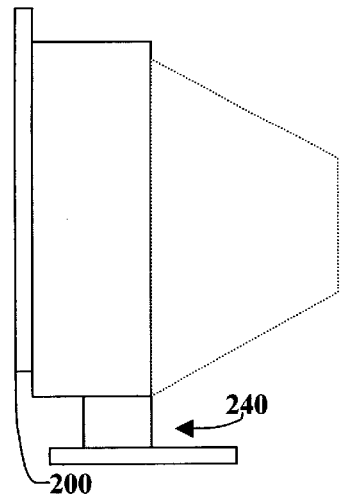
FIG. 2b is a side view of a three-sided message board mounted on the front of a computer monitor. Once again, the dotted lines represent that a CRT may or may not exist.

FIGS. 2a and b demonstrate a message board 200 that solves the difficulty of accessing controls that usually exist on the lower part of the front of a computer monitor. The message board 200 surrounds only three sides of the perimeter of a monitor 240. FIG. 2a shows the front view of the three-sided message board 200 attached to the computer monitor 240, with its screen 210 and controls 230 accessible. FIG. 2b shows the side view of the message board 200, and monitor 240. Once again, monitor 240 may be a CRT monitor or a flat-panel display; thus, the optional tube part of the monitor is shown with dotted lines. Obviously, if the controls are not below the monitor screen, the message board 200 can be attached in a different orientation to allow the user to access the monitor controls. In addition, if the controls are on two sides of the monitor screen 210 a two-sided message board could be used. The three-sided message board 200 can also be an artistic shape, such as a hat or apple, or a lopsided shape, such as an egg or football, thus increasing its beauty and/or writing surface area.

Figure 2C:
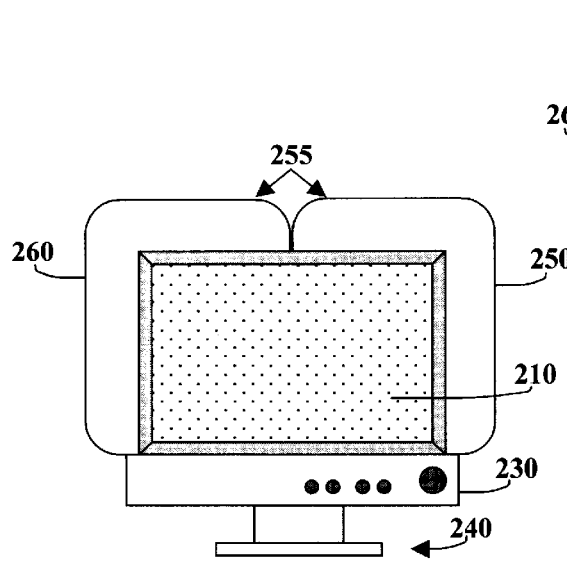
FIG. 2c is a front view of a two-piece, three-sided message board mounted on the front of a computer monitor.
Figure 2D:
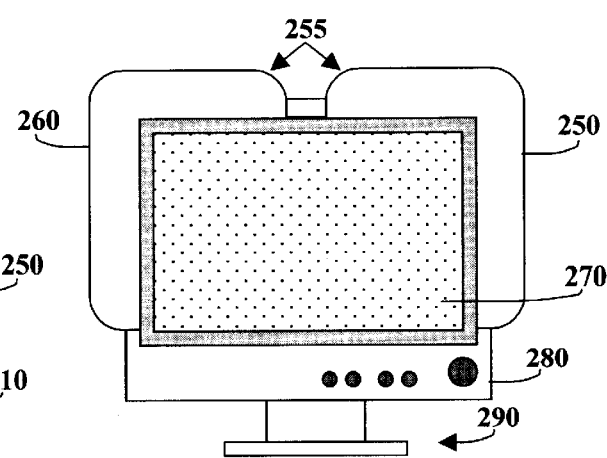
FIG. 2d is a front view of a two-piece, three-sided message board mounted on the front of a larger computer monitor than in FIG. 2c.

FIGS. 2c and d demonstrate a two-piece, three-sided message board 255, consisting of two two-sided, message board pieces 250 and 260. FIG. 2c shows the front view of the message board pieces 250 and 260, and a computer monitor 240 with its screen 210 and controls 230 accessible. FIG. 2d shows the front view of the message board 255, consisting of pieces 250 and 260, attached to a monitor 290 with its screen 270 and controls 280 accessible. Monitor 290 has a larger screen size than monitor 240 (i.e. 17" instead of 15", or 21" instead of 17"). Once again, monitor 290 may be a CRT monitor or a flat-panel display. This combination does not need to have a center segment connecting both pieces. However, there can be some type of connecting segment between the pieces 250 and 260. This connecting segment could make both pieces appear as one piece for larger monitors and/or structural integrity to the combination. Obviously, if the controls are not below the monitor screen, the message board pieces 250 and 260 can be attached on different sides of the monitor to allow the user to access the monitor controls. In addition, one piece may be used alone, or the pieces can be attached to different corners for desired visual or functional impact.

This two-piece, three-sided message board 255 solves the difficulty of accessing the monitor's controls, as did the one-piece, three-sided message board 200. The two-piece message board 255 also has additional advantages. It fits any size monitor, thus reducing the number of necessary models and eliminating buyer confusion about what size monitor he has. Because the two-piece message board 255 can be dove-tailed upon itself, it fits into a smaller package than the one-piece message board 200, thus reducing manufacturing packaging cost, the cost of shipping a few units, and the amount retail display space occupied. It also can be used with one or both pieces. The pieces do not have to be placed on the top two corners of the monitor as shown in FIGS. 2c and d, they can be placed on two diagonal or side corners.

A desirable size for the one-piece, three-sided message board 200 includes a 4½ inch writing surface on the sides and top, and an overall dimension of 13¾ inch height and 20¾ inch width for a 15" monitor. Similarly, the two-piece message board 255 is the previous size cut in half with the two top inner corners rounded. The overall size of the one-piece message board 200 must increase for larger monitors to maintain the 4½ inch writing surface. In contrast, the two-piece message board 255 does not need to change size, although the size can be increased for additional message area. The attachment can be removable, hinged or flexible, as discussed above regarding the four-sided board, or more permanent, such as using double-sided foam tape since the controls are accessible for these three-sided message boards.

Since these face mount message boards 100, 105, 200 and 255 are attached to the monitor's bezel (i.e. monitors 150, 150, 240 and 290, respectively), each message board must be flexible enough to follow the contour of the monitor, but firm enough to write upon. Many materials exist which meet this flexibility requirement. If their surface cannot work as a message board, the desired surface can be attached. For example, cork can be attached to masonite to create a bulletin board. In addition, a re-usable writing surface can be attached or painted onto masonite to create a write board. Desirable materials include ⅛ inch thick masonite, melamine and erasable plastic, 3⁄16 inch heavy-duty cardboard, glass, and 1⁄16 inch erasable metals. Melamine, glass and erasable metals and plastics have the additional advantage of their surface working as a re-usable writing surface; thus, nothing additional needs to be attached and the manufacturing cost is reduced. Erasable plastics currently include PETG (i.e. Spectar™ by Kodak), polycarbonate, polysulfone, copolymer polypropylene, nylon, styrene, K-resin and acrylic. However, a few pens, such as Sanford's Expo™ pens, use ketones, such as MIBK, to erase. Ketones react with some of the plastics above except polysulfone, copolymer polypropylene, styrene and nylon. With other plastics, such as polycarbonate and acrylic, a clear hard coat or chemically resistant material can be added, either directly to the material or molded with the material as a separate film. The other pens on the market use alcohol to erase, and the above plastics are chemically resistant. Overall, acrylic is the most preferable plastic since it is a good balance between expense, rigidity and chemical resistance.

In addition, by using a material that provides its own rigidity and is a reusable writing surface, such as melamine or acrylic, the writing surface area is maximized for the size of the message board. Finally, much novelty in the three- and four-sided design relates to using the erasable plastic or metal, which offers the advantage over masonite or melamine of coming in different colors, transparencies and thinner and lighter embodiments.

Importantly, message boards 100, 105, 200 and 255 are conveniently located for taking notes without blocking the user's view of the monitor's screen 110. In addition, by using thin acrylic rather than thicker cardboard or melamine or a fatter molded plastic, the monitor screen does not appear to be farther away from the user, thus making it difficult to read. Without message board 100, monitor 150's perimeter usually goes to waste or contains sticky notes (i.e. a small piece of paper with glue on a portion of one side that remains sticky after being attached and removed, such as 3M's Post-It™ Note). This invention best utilizes that wasted space.

Finally, the one-piece, three- and four-sided message boards may contain an anti-glare and/or anti-static screen in the middle, thus increasing the message board's functionality.

Wing Mount Message Boards (FIG. 3)

FIG. 3 demonstrates another way to conveniently attach a message board 300 to a computer monitor 310. This method involves having the message board 300 attached to the side of the monitor 310. The drawings show the boards attaching to the left or right side. However, the top or bottom side of the monitor could be used. FIG. 3a is the front view and FIG.

3b is the side view. A preferred size for the message board's writing surface is 5 inches wide by 10½ inches tall. When using a malleable material, such as acrylic, the message board does not need a special attachment as the material can be molded or bent to attach to the side of the monitor. In this embodiment, the message board is 10½ inches tall with a width including a 1¼ inch connecting surface, a 105-degree bend taking about ¼ inch, and the desired 5-inch message surface.

When using a malleable material, rigidity and surface requirements are the same as described above for the face mount message boards.

The message board 300 may also be attached via a flexible or hinged mechanism 320, such that the message board 300 can be rotated out of the way when not in use. FIGS. 3c and 3d show the front and side view, respectively, of the message board 300 in a non-use position when attached to the monitor 310 via the flexible or hinged mechanism 320. Once again, both side views show the CRT as an optional part of the computer monitor by using dashed lines.

Due to the proximity to the screen of message boards 100, 105, 200, 255, and 300, a connecting clip can be used to hold paper against these message boards and aid in typing printed material into the computer. In addition, creative shapes, such as ears, apples, hats, etc., or just curved edges can be used to increase the artistic value and beauty of the message board.

Message Boards Attached to a Computer Case (FIGS. 4 and 5)

Figure 4A:
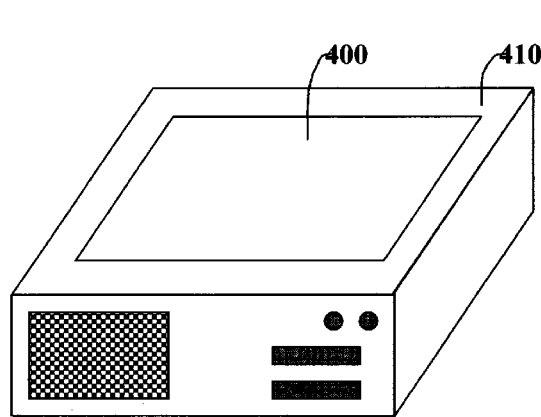
FIG. 4a is a left-top-front perspective of a message board mounted on the top of a desktop computer.
Figure 4B:
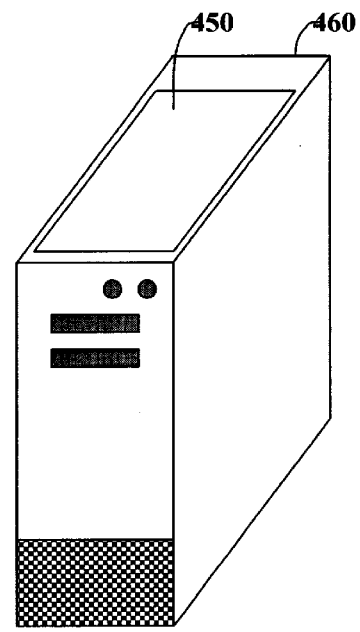
FIG. 4b is a left-top-front perspective of a message board mounted on the top of a tower computer.

FIGS. 4, 5 and 6 involve attaching a message board to a computer case, including a laptop (as described in the next subsection), such that it is conveniently located and does not eliminate the functionality of the computer. FIG. 4a displays a message board 400 attached to the top of a desktop computer case 410. The convenience of this configuration depends upon the location of the desktop computer case 410. However, for many people, the desktop computer case 410 exists on the side of a person's desk, and thus, the message board 400 is in a convenient location. FIG. 4b shows a message board 450 attached to the top of a tower computer case 460. Once again, the convenience of this configuration depends upon the location of the tower computer case 460. However, for many people, the tower computer case 460 exists next to a person's desk, and thus, the message board 450 is in a convenient location.

When attached to the top of a computer, message boards 400 or 450, the preferred embodiment includes a flat piece of erasable material, such as acrylic, melamine or other erasable metals or plastics, or a flat piece of masonite or carboard with the message surface attached or painted on. Its size can range from 10 by 10 inches to 5 by 10 inches. However, it may also include a decorative border or frame with other types of write and bulletin message boards discussed above. The border may consist of push-on colored rubber, and the frame may be molded in plastic.

FIG. 5 shows a message board attached to the side of a computer case, possibly using a hinged or flexible attachment. By using a hinged or flexible attachment, the board can be rotated open for more convenient access when in use and rotated shut to reduce clutter when not in use. When using a malleable material, such as acrylic, the message board does not need a special attachment as the material can be molded or bent to attach to the side of the computer case. Once again, all of the rigidity and surface requirements for the face mount message boards, as discussed above, apply.

Figure 5A:
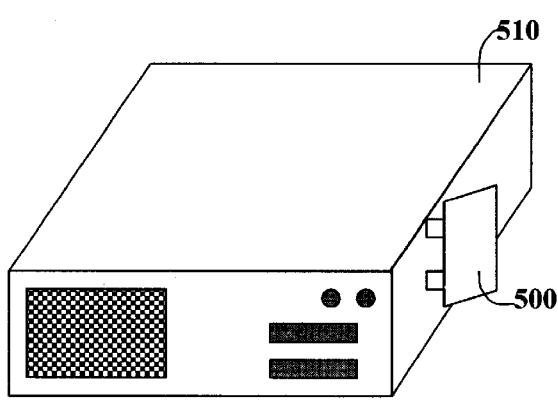
FIG. 5a is a left-top-front perspective of a message board mounted with a flexible or hinged attachment on the side of a desktop computer, in the partially open position.
Figure 5B:
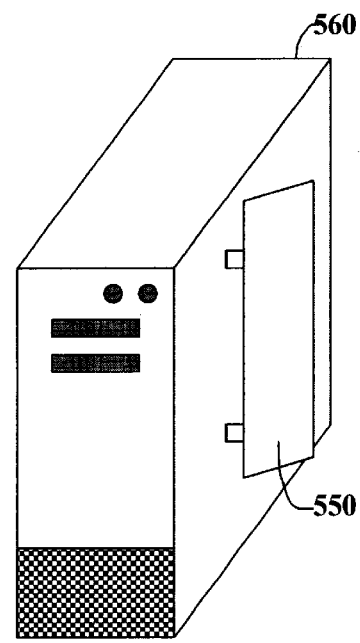
FIG. 5b is a left-top-front perspective of a message board mounted with a flexible or hinged attachment on the side of a tower computer, in the partially open position.

FIG. 5a shows such a message board 500 attached to the side of a desktop computer case 510. Preferably, message board 500 is 5 by 5 inches. FIG. 5b shows such a message board 550 attached to the side of a tower computer case 560. Preferably, message board 500 is 10 inches high by 5 inches wide. Once again, the convenience of either message board 500 or 550 depends upon the computer case's location.

If using a hinged or flexible connection for message boards 300, 500 or 550, the rotating connection must be able to withstand the pressure of writing, erasing and posting messages. For a hinged connection, an inexpensive solution uses a locking hinge, possibly with only one locked position to further reduce manufacturing costs.

Many computer monitors and/or cases are stored inside a computer stand. In this instance, the message boards 300, 400, 450, 500 or 550 could be attached to the computer stand instead of the monitor.

Message Boards Attached to a Laptop (FIG. 6)

Figure 6A:
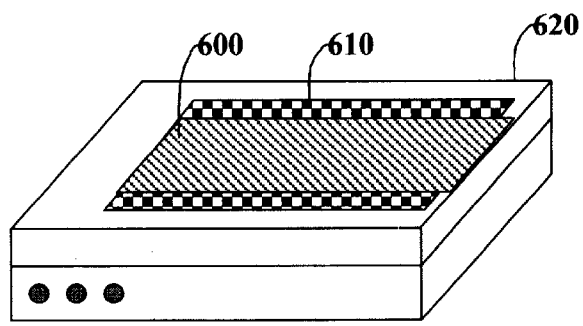
FIG. 6a is a left-top-front perspective of a message board mounted with a sliding device on the top of a laptop computer with the screen and message board in the closed position.
Figure 6B:
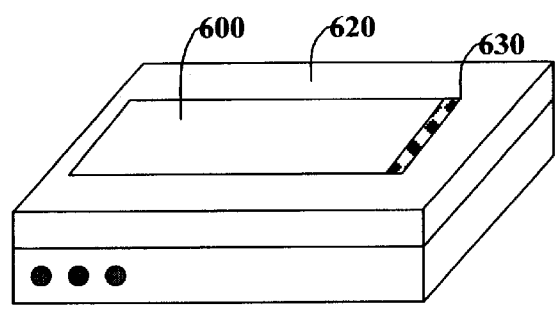
FIG. 6b is a left-top-front perspective of a message board mounted with a flexible or hinged attachment on the top of a laptop computer with the screen and message board in the closed position.
Figure 6C:
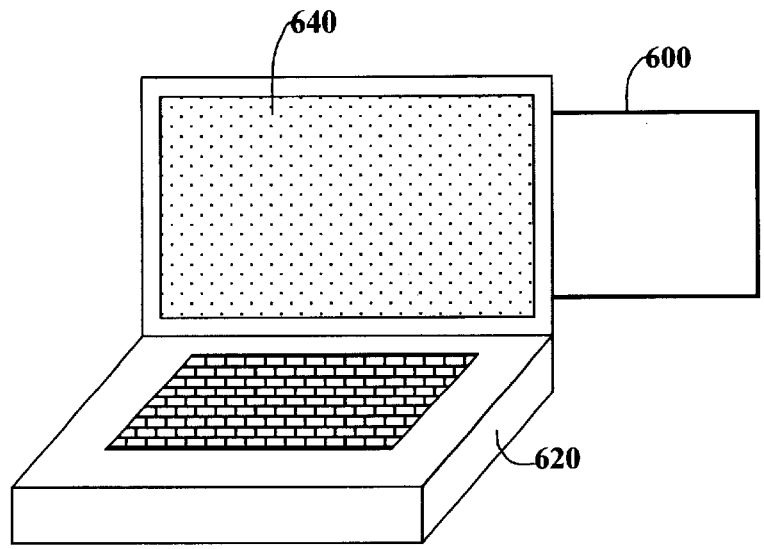
FIG. 6c is a left-top-front perspective of a message board mounted with a sliding, flexible or hinged attachment on the top of a laptop computer with the screen and message board in the open position.

FIGS. 6a, b and c show several configurations for a laptop computer 620. These configurations are preferable to mounting a flat message board directly on the top or bottom of the laptop computer 620 because these configurations allow access to a message board 600 while a laptop screen 640 is open and in-use. FIG. 6a shows the configuration where the message board 600 is attached to the top of laptop computer 620 using a sliding mechanism 610 such that the message board can be slid out to the side of the laptop screen 640 when in-use, as demonstrated in FIG. 6c. In FIG. 6a, the message board 600 is hatched since this is the back of the board; thus, the front of the message board 600 is properly oriented when the laptop's screen 640 is open. When laptop computer 620 is closed, the erasable messages are protected from accidental erasing. In addition, the back of the message board may also contain notes, either as a write board or bulletin board. FIG. 6b shows the configuration where the message board 600 is attached to the laptop computer 620 using a flexible or hinged mechanism 630 such that it can be rotated out to the side of the laptop screen 640 when in-use, as also demonstrated in FIG. 6c. With this configuration, you see the front of the message board 600 when the laptop screen is closed; thus, you can take messages without opening laptop computer 620.

Once again, the hinged or flexible connection 630 must be able to withstand the pressure of writing, erasing and posting messages. For a hinged connection, an inexpensive solution uses a locking hinge, possibly with only one locked position to further reduce manufacturing costs.

In addition, the message board 600 may be oriented such that when it is open, it is located above the computer rather than to the side. This will be advantageous when horizontal space is limited, such as when on an airplane. Alternatively, the message board 600 may have a rotating base which allows the message board 600 to open in any orientation relative to the laptop screen. In another configuration, message board 600 can be attached to the bottom of the laptop and extend to either side or the front and be written upon like a desk blotter.

Preferably, the message board is around 6 by 6 inches, but can be any size that fits on a standard laptop. The message board can be as simple as a piece of acrylic that slides or rotates out, or include a molded frame with bearings and any type of write or bulletin board surface.

Message Boards for a Keyboard (FIG. 7)

FIG. 7 demonstrates using a message board with a computer keyboard 720. In FIG. 7a, a message board 700 is below the keyboard 720. A raised surface 710 is desirable so that the user's wrist does not accidentally erase the message board 700. Optionally, the raised surface 710 can be padded for the user's comfort. This raised surface could be made of a molded frame for the message board or consist of material which attaches to the message board, such as adding a keyboard wrist-rest on top of the front of the message board. A second wrist-rest on the back of the message board may be advantageous. Alternatively, the message board may have a protective surface that attaches and removes easily, possibly via static electricity, to keep it from being erased. In FIG. 7b, a message board 730 is located above the computer keyboard 720. The message board could also be located on either side of the keyboard, or on one, two, three or four sides of the perimeter.

Figure 7A:
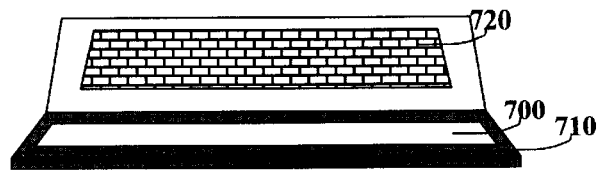
FIG. 7a is a top-front perspective of a computer keyboard with a message board below the keyboard. The message board is surrounded by a raised partition.
Figure 7B:
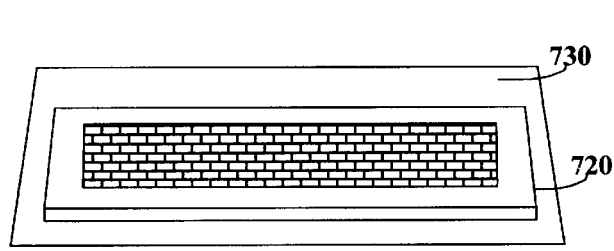
FIG. 7b is a top-front perspective of a computer keyboard where a message board fits underneath the keyboard and extends behind it with a writing surface.
Figure 7C:
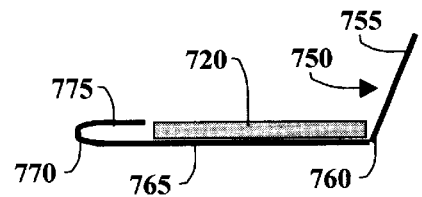
FIG. 7c is a side view of a computer keyboard where a message board fits underneath the keyboard and extends vertically behind it with a writing surface.

The message board 730 can be flat. However, FIG. 7c shows a shaped message board 750 that extends vertically behind the keyboard, thus it does not waste valuable desk space. Specifically, the keyboard 720 sits on top of the shaped message board 750, which consists of a vertical message surface 755, a nearly right-angle bend 760, a base section 765 upon which the keyboard sits, and an optional wrist-rest. Bend 760 is a preferable 110-degrees such that the message surface faces up as well as out. Bend 760 may consist of a right angle bend with a slight bend away from the user after the message board surface 755 rises above the height of the keyboard, thus keeping the message surface closer to the user.

The integration of the wrist-rest and the message board is a great option since ergonomics in the workplace is not only very desirable but also being considered as law in the United States. The optional wrist-rest consists of a 180-degree bend 770 and a wrist-rest section 775. Preferably, the wrist-rest surface 775 is padded or jelled, and can be contoured with bend 770 for increased comfort. Alternatively, the wrist-rest may include a semicircular bend starting after the base section 765 extends past the front edge of the keyboard rather than curving back with bend 770, thus conserving material. If the wrist-rest is not molded as part of the message board, the base section 765 may either extend past the keyboard upon which the user can place an existing wrist support, or only far enough to create a stable writing surface and base for the keyboard. The wrist support, whether separate or part of message board 750, will increase the stability of the message surface 755 since the pressure of the user's wrist will counteract the force of writing.

The message board 750 may be divided, along its depth, into two separate but similar halves. This division improves its fit with ergonomic keyboards which have the keys divided into two halves. Sometimes the keys fit on one keyboard base with each half angled to the corresponding side, such as Microsoft's Natural Keyboard™. Other times, these ergonomic keyboards have two base pieces, each with half the keys, so the user can adjust them to the desired position. Given these two keyboard designs, one can see how dividing the message board improves its fit.

Message board 750 can be made as one piece using a malleable material, such that it can be molded or bent into the desired shape. The material may have a surface that works as the message surface 755, or have the message surface 755 attached. For example, acrylic is a desirable material since it can be molded or bent into shape, and its surface works as a re-usable writing surface. The bulletin surface, such as cork, can be attached to all or part of the message surface 755. Other materials, such as erasable metals and plastics, or other metals, including copper or aluminum, could be used with a write or bulletin surface attached, and our fully discussed above in reference to the face mount message boards. Preferably, message board 750 is as long as the average keyboard, or around 19 inches. Message board 750 also has a preferred writing surface 755 that extends 5 inches high, a base 765 that is between 6 and 12 inches deep, and wrist-rest surface 775 that is around 2 inches deep and ¾ inches above base 765.

Figure 7E:
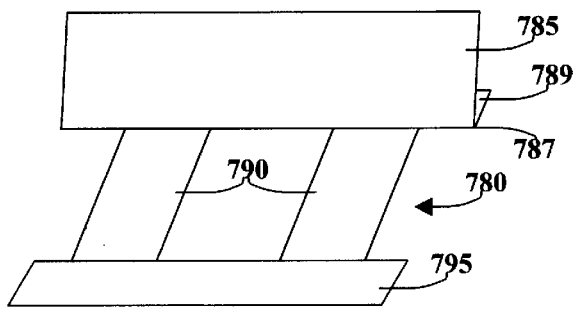
FIG. 7e is a left-top-front perspective of a modular message board designed for a computer keyboard.

Alternatively, the keyboard message board could be built as separate modules attached with one or more connectors, which when attached are similar to message board 750. The modules would consist of at least a base module and a message module. With this design, more than one material can be used for different sections of message board 750. Thus, cheaper materials can be used in some places. Base 765 can be made of almost any material, and message surface 755 could be made of masonite or melamine. The connectors could be mechanical or as simple as glue, double sided tape, or hook-and-loop fastener. A simple mechanical attachment uses a push rivet, as shown in FIG. 7f. The connectors attaching these modules could also be hinged or flexible, thus allowing message board 750 to be packaged in a smaller container since it could fold shut, as well as allow the user to adjust the desired writing angle. In addition, the attachment of these modules could be performed by the end-user such that the group of items can fit into smaller packaging even if the connectors are not hinged or flexible.

Figure 7D:
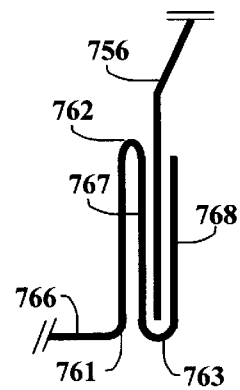
FIG. 7d is an enlarged side view of an alternative connecting section for a modular message board similar to that of FIG. 7c.
Figure 7F:
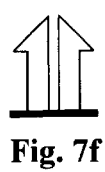
FIG. 7f is an enlarged side view of a push rivet which can be used to connect two modules.

FIG. 7d shows an enlarged side view of the connecting section of an alternative modular configuration, in which separate connectors are not needed to attach the base and message surface. In this configuration, bend 760 is replaced by three bends, 761, 762 and 763, such that the message surface 756 (the equivalent of message surface 755) easily attaches to base 766 (the equivalent of base 765). Specifically, the message surface 756 slides between bends 762 and 763, and the vertical sections 767 and 768 between these bends hold the message board in place. These vertical sections are preferably ½ to 2 inches high. Optimally, message surface 756 includes a second bend after the surface rises above the keyboard such that the message surface 756 faces slightly upwards. Alternatively, the message surface 756 could be straight and the vertical sections 767 and 768 could be angled upwards. In another alternative configuration, one horizontal 180-degree bend in the base and a corresponding bend in the message surface could replace the three vertical bends. In yet another embodiment, the base could slope upwards when moving towards the back, thus eliminating the first vertical bend 761 and holding the keyboard in a more ergonomic position. Any of these embodiments could include raised bumps in one module and corresponding depressions or holes in the other module to aid in attaching the modules. Finally, there are many more configurations that are obvious from the above discussion, each with its own balance of stability versus complexity.

FIG. 7e shows a left-top-front perspective of another modular embodiment. Although similar to message board 750, this modular message board 780 has many advantages. It can be easily assembled by the end-user, such as with double-sided foam tape. This allows a smaller package to be used, thus reducing shipping costs and retail display space. In addition, the design can be assembled by the end-user to better fit his/her keyboard, thus improving ergonomics and reducing the number of required models since keyboards come in all different sizes. It can also use less material when the optional wrist-rest is included.

Modular message board 780 includes three modules. The message module includes message surface 785, bend 787, and attaching surface 789. The base module includes two base pieces 790. The wrist-rest module includes a rigid piece 795.

More specifically, the message surface 785 is 6 inches high and 18 inches wide. Bend 787 has an inside angle of 75 degrees. The bend may contain a vertical section equal to the height of the message board, and then another bend, with a combined inside angle of 75 degrees. Attaching surface 789 is 1½ inches long and attaches to the base pieces 790. The attachment can use double sided tape, glue, hook-and-loop fastener, mechanical clamps, possibly hinged, or removable push rivets (FIG. 7f, enlarged view) with corresponding holes in the pieces. The base pieces 790 are shown as rectangles 11 inches deep and 3 inches wide so that they fit under the deepest keyboard and can be attached to the message and wrist-rest module. Alternatively, each base piece could be designed to have an adjustable depth, possibly being tubular and telescoping for various keyboard depths. These tubular sections can have flat ends for attaching to the message and wrist-rest modules, or integrated c-clamps. The wrist-rest module can be as simple as a rigid 1 by 18 inch rectangle 795 upon which a standard foam wrist-rest can sit (as shown), or as complicated as a padded or jelled segment of molded acrylic. The wrist-rest module must have a section for attaching to the base pieces 790 and be rigid enough to hold the base pieces 790 together. Once again, the attachment can use double sided tape, glue, hook-and-loop fastener, mechanical clamps, or removable push rivets (FIG. 7f) with corresponding holes in the pieces. Once these modules are combined, the keyboard then sits on base pieces 790. As mentioned above, the assembly may be performed by the end-user with the resulting advantages.

Message Boards for a Mouse (FIG. 8)

Figure 8A:
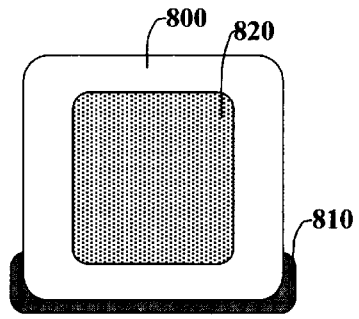
FIG. 8a is a top view of a computer mouse pad with a four-sided message board and raised wrist rest, which prevents the user from accidentally smearing the message board text.
Figure 8B:
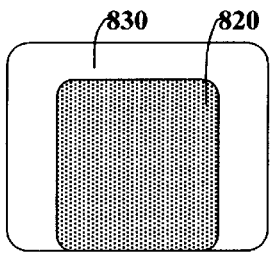
FIG. 8b is a top view of a computer mouse pad with a three-sided message board.

FIG. 8 shows a message board with a computer mouse pad 820. In FIG. 8a, a message board 800 surrounds all four sides of the mouse pad 820. A raised surface 810 is desired at the portion of the mouse pad 820 towards the user such that the user's wrist does not erase the message board 800. Optionally, the raised surface 810 can be padded for the user's comfort. Alternatively, the message board may have a protective surface that keeps if from being erased, such as an easily attached and removed covering, possibly held in place by static electricity. In FIG. 8b, a message board 830 is located only on three sides of the mouse pad 820. The side of the mouse pad towards the user is left alone so that the user's wrist is not interfered with while using the mouse and to limit the possibility of accidental erasure. Alternatively, the message board could be on one or two sides of the mouse pad's perimeter. In the preferred embodiment, the message board extends 3 to 4 inches out on each side.

Figure 8C:
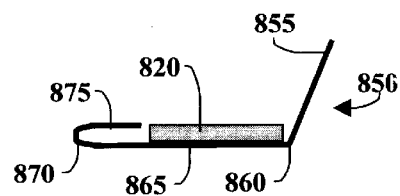
FIG. 8c is a side view of a computer mouse pad where a message board fits underneath the mouse pad and extends behind it with a vertical writing surface.

FIG. 8c shows a shaped message board 850, which extends vertically behind the mouse pad, thus not wasting valuable desk space. Specifically, the mouse pad fits on shaped message board 850, which consists of a vertical message surface 855, a nearly right-angle bend 860, a flat base surface 865 upon which the mouse pad sits, and an optional wrist-rest. Bend 860 is a preferable 105-degrees such that the message surface faces up as well as out. Bend 860 may consist of a right angle bend with a slight bend away from the user after the message board surface 855 rises above the height of the mouse, thus keeping the message surface closer to the user.

The optional wrist-rest consists of a 180-degree bend 870 and a wrist-rest section 875. Preferably, the wrist-rest surface 875 is padded or jelled, and can be contoured with bend 870 for increased comfort. Alternatively, the wrist-rest may include a semicircular bend starting after the flat base 865 extends past the front edge of the mouse pad rather than curving back with bend 870, thus conserving material. If the wrist-rest is not included, the message board may extend past the mouse pad where the user attaches an existing wrist support or it may only extend far enough to create a stable message surface 855 and mouse pad base 865. The wrist support, whether separate or part of message board 850, will increase the stability of the message surface 855. Importantly, with ergonomics in the workspace not only desirable but being considered as law, the integration of the wrist-rest and message board 850 is a great option.

The materials and construction, including modular designs, of message board 850 are identical as described above for message board 750 of FIG. 7c with the size scaled down to fit around a mouse pad. Preferably, the message board 850's width is around 6 inches, and the depth of base 865 is around 8 inches. The writing surface 855 is still around 5 inches high and the wrist-rest 875 is still 2 inches deep and ¾ inches high. Similarly, the bend 860 may be replaced by a hinge, flexible connector, or three bends such that message board 850 can be modular with all the advantages discussed above for FIGS. 7c and d. In addition, similar construction of the modular design in 7e can easily be adapted for the mouse and mouse pad.

Write and Bulletin Board Combinations, Electronic Compatibility, and Accessories (FIGS. 9, 10 and 11)

Figure 9A:
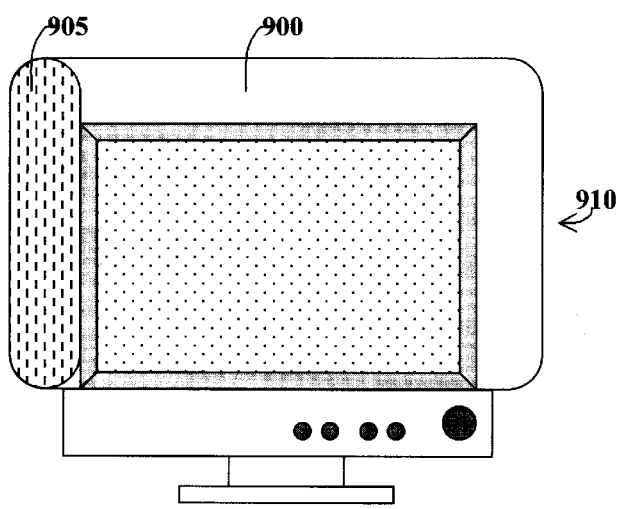
FIG. 9a is a front view of a computer monitor with both types of message boards mounted in close vicinity, specifically a three-sided message board consisting of a two-sided write board and a one-sided bulletin board.
Figure 9B:
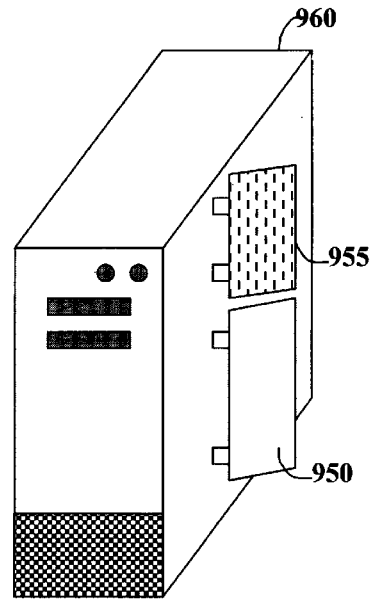
FIG. 9b is a left-top-front perspective of a tower computer with both types of message boards in close vicinity, including one write and one bulletin message board.

As defined above, the message board may consist of a write board or a bulletin board. However, it may be advantageous to mount two message boards in close vicinity, where one is a write board and one is a bulletin board. Any configuration described above can have both types of message boards. In addition, a bulletin board could be attached to the write board. Two preferred configurations are shown in FIG. 9. FIG. 9a shows the front view of a computer monitor 910 with a write message board 900 and bulletin message board 905 attached to the monitor 910's perimeter. The bulletin board 905 could be a separate board or attached to the write board 900. FIG. 9b displays the tower computer 960 with a write message board 950 and bulletin message board 955 in close vicinity to each other. Once again, the bulletin board 955 could be attached directly to the write board 950. Finally, both types of boards could be attached to a molded frame.

Advantageously, the message board may be electronically compatible. An electronically compatible (EC) message board may consist of an electronic recording and display device, i.e. a digitizing notepad. The EC message board may include a non-electronic writing surface where the pen's movements are recorded for use with a computer, or where the writing on the message board can be scanned at any time desired by the user. Thus, not only can the text on the message board be easily erased and re-written, but the user's notes can also be transferred into his/her computer, such as a contact management or word processing program. If optical character recognition is included, the writing on the board can be input to the computer as both text and images. All these core technologies for EC message boards exist today and new ones will exist in the future, but it is novel and advantageous to combine them with the computer in any configuration described or inferred from the description above.

Figure 10A:
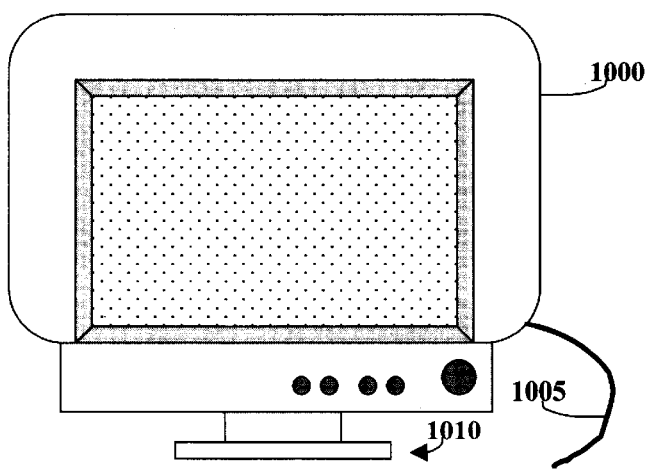
FIG. 10a is a front view of a computer monitor with a three-sided, electronically compatible message board.
Figure 10B:
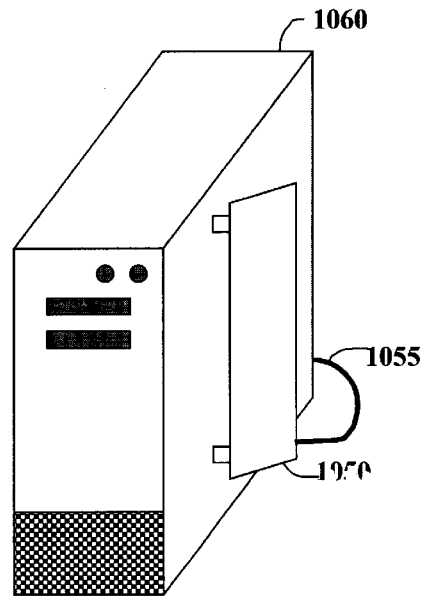
FIG. 10b is a top-front perspective of a tower computer with an electronically compatible message board.

Two specific examples are shown in FIG. 10. FIG. 10a shows the front view of a computer monitor 1010 with an EC message board 1000 and connecting cable 1005 attached to the monitor 1010's perimeter. FIG. 10b displays the tower computer 1060 with an EC message board 1050 and a connecting cable 1055.

Figure 11A:
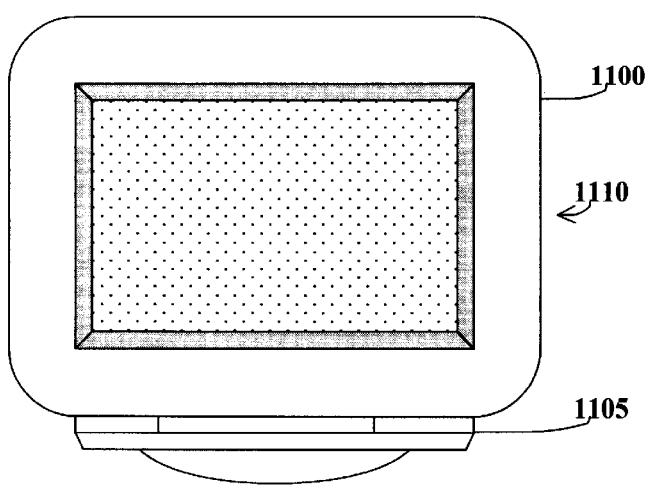
FIG. 11a is a top-front view of a computer monitor with a four-sided message board with attachments for storing supplies.
Figure 11B:
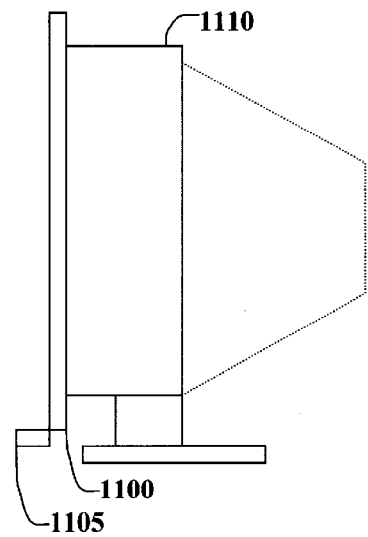
FIG. 11b is a side view of a computer monitor with a four-sided message board with attachments for storing supplies.

The message board may contain attachments for storing message board and desk supplies, such as markers, pushpins, paper clips, pencils, pens and photographs. FIG. 11 displays one example of such a configuration using a computer monitor and four-sided message board when viewed from the top-front (FIG. 11a) and side (FIG. 11b) of the monitor. These attachments may be a permanent part of the message board, or be re-attachable, such as clip-on, clip-off containers.

Finally, any of these message boards can have a surface that can be covered with a new re-usable write or bulletin surface. These new re-usable surfaces could contain advertisements, calendars, trivia, jokes and/or new colors.

Scope

The foregoing descriptions of the preferred embodiments of the invention have been presented to teach those skilled in the art how to best utilize the invention. Many modifications and variations are possible in light of the above teaching. For example, we did not include an example for every computer peripheral, and the above teaching makes it easy to apply this invention to the peripheral, like adding a message board to a printer. In addition, there may be alternative types of message boards that fit the definition that can be easily applied due to the teachings in this invention. To this end, the following claims define the scope and spirit of the invention.

We claim:

1. A write board that is attachable to a computer monitor, wherein said computer monitor comprises a screen, a bezel around a perimeter of said screen, any number of controls on said bezel, and an inner and outer edge of said bezel, wherein said write board comprises of a base structure, with an inside and outside edge, and a writing surface, said writing surface is directly writable and erasable upon, and reusable multiple times, and attached to said base structure, said base structure is sufficiently flexible to follow a curve of the monitor's bezel, and is attachable to said bezel, thus being non-obtrusive to a user, and said write board is sufficiently rigid to provide an adequate writing surface size, extending at least past said outer edge of said bezel, and to provide stability to write upon and erase said writing surface by the user, wherein said write board surrounds at least part of only three or fewer sides of said computer monitor screen and does not block access to all of the controls on said computer monitor bezel, and said base stricture and said writing surface comprise one-material;

whereby the monitor's screen is visible and said write board can be written upon and erased by the user without being obtrusive to the user.

2. The apparatus of claim 1 in which said one-material is acrylic.

3. The apparatus of claim 2 in which said acrylic is approximately ⅛ inch thick.

4. The apparatus of claim 1 in which said write board is attachable to said bezel with double sided adhesive tape.

5. The apparatus of claim 1 in which said write board is attachable to said bezel with hook-and-loop fastener.

6. The apparatus of claim 1 in which an antiglare screen is attached to said write board and located over the monitor's screen.

7. The apparatus of claim 1 in which a bulletin board is attached to part of said write board.

8. The apparatus of claim 1 in which said write board has an inside edge which is substantially three sides of a rectangle in shape to follow three sides of said screen, an outside edge of said write board extending at least 3 inches on each side to form said writing surface, and said write board covers at least part of only three sides of said computer monitor bezel, thereby leaving the monitor's controls accessible and producing a reasonably sized writing surface for a person to write upon.

9. The apparatus of claim 8 in which said one-material is acrylic.

10. A write board that is attachable to a computer monitor, wherein said computer monitor comprises a screen, a bezel around a perimeter of said screen, any number of controls on said bezel, and an inner and outer edge of said bezel, wherein said write board comprises of a base structure, with an inside and outside edge, and a writing surface, said writing surface is directly writable and erasable upon, and reusable multiple times, and attached to said base structure, said base structure is sufficiently flexible to follow a curve of the monitor's bezel, and is attachable to said bezel, thus being non-obtrusive to a user, and said write board is sufficiently rigid to provide an adequate writing surface size, extending at least past said outer edge of said bezel, and to provide stability to write upon and erase said writing surface by the user, wherein said write board surrounds at least part of only three or fewer side of said computer monitor screen and does not block access to all of the controls on said computer monitor bezel, in which said write board has an inside edge of substantially L-shape to follow two sides of the substantially rectangular shape of said screen and an outside edge of said write board extending at least 3 inches on each side to form said writing surface, and resulting in a substantially L-shaped write board which covers at least part of only two sides of said computer monitor bezel.

11. The apparatus of claim 10 in which said base structure and said writing surface comprise one-material.

12. The apparatus of claim 11 in which said one-material is acrylic.

13. A write board that is attachable to a laptop computer, wherein said laptop computer comprises of:

a screen, and a keyboard, said write board is erasable and reusable for multiple times and comprises of:

a base structure, and a writing surface, wherein said laptop computer has a closed position when not in use and an open position when in use, said writing surface is directly erasable and writable upon for multiple times and attached to said base structure, and wherein said write board is attachable to said laptop computer via a mechanism enabling said writing surface to be both accessible when the laptop is in the open and in-use position, and stable to write and erase upon and said write board is storable against said laptop computer when said laptop computer is in said closed position.

14. The apparatus of claim 13 in which said mechanism enables sliding of said write board to an open setting to a side of said laptop such that said writing surface is facing said laptop computer when said write board is not slid to said open setting, and said writing surface is accessible when said write board is slid to said open setting.

15. The apparatus of claim 14 in which said base structure and said writing surface comprise one-material.

16. The apparatus of claim 15 wherein said one-material is acrylic.

17. The apparatus of claims 13 in which said writing surface is facing out when said write board is in a closed setting, and said mechanism enables rotation of said write board to an open setting to a side of the laptop, and lock said write board in place, such that said write board can be written upon in both said open setting and said closed setting.

18. The apparatus of claim 17 in which said base structure and said writing surface comprise one-material.

19. The apparatus of claim 18 wherein said one-material is acrylic.

20. A write board, which is erasable and reusable multiple times, usable with a computer keyboard wherein said write board comprises of:

a base section, a writing section, and a writing surface, wherein said base section is designed to fit under said computer keyboard, said writing surface is attached to said writing section, said writing surface extends upright for writing behind said computer keyboard, said writing section is attachable to said base section via a mechanism that resists changing position or collapsing during the process of writing, said writing surface is directly erasable and writable upon for multiple time, whereby the keyboard supports said writing section.

21. The apparatus of claim 20 in which the writing surface extends less than 6 inches in length in the upright direction.

22. The apparatus of claim 20 in which said mechanism connecting said writing section and said base section is attached by an end user.

23. The apparatus of claim 20 in which said writing section and said writing surface comprise of one-material.

24. The apparatus of claim 23 in which said one-material is acrylic.

25. The apparatus of claim 20 in which said base section comprises one or more substantially planar pieces and said writing section comprises an upright part attached to a connecting part via a curved part, wherein said upright part is substantially planar, extends upwards for writing behind the keyboard, and attaches to said writing surface, and said connecting part attaches to at least one of said substantially planar pieces of said base section.

26. The apparatus of claim 25 in which said base section comprises of at least two substantially planar pieces, wherein one or more of said substantially planar pieces extend from the front to the back of the keyboard, and one or more of said substantially planar pieces extends along the front of the keyboard and is designed for placement of a wrist-rest, whereby further adding stability to the writing surface.

27. The apparatus of claim 25 in which said writing section and writing surface are made of acrylic and said pieces are attachable by an end-user to fit the end-user's computer keyboard.

28. The apparatus of claim 20 in which said base section extends past the front of said computer keyboard, and includes a bend in front of said computer keyboard that forms a wrist-rest.

29. The apparatus of claim 28 wherein said base section is made of acrylic and the bend is semicircular.

* * * * *

UNITED STATES PATENT AND TRADEMARK OFFICE
CERTIFICATE OF CORRECTION

PATENT NO.   : 6,686,900 B1
DATED        : February 3, 2004
INVENTOR(S)  : Kenneth Lee Levy, Amy Michelle Weissfeld and J. Robert Craig It is certified that error appears in the above-identified patent and that said Letters Patent is hereby corrected as shown below:

Column 15,
Line 52, change "stricture" to -- structure --

Column 16,
Line 33, change "side" to -- sides --

Column 17,
Line 9, change "claims" to -- claim --

Signed and Sealed this

Twenty-sixth Day of October, 2004

JON W. DUDAS
*Director of the United States Patent and Trademark Office*